United States Patent
Chen et al.

(10) Patent No.: US 9,674,416 B2
(45) Date of Patent: Jun. 6, 2017

(54) METHOD FOR CONTROLLING FLASH TIMING OF EXTENSION FLASH MODULE

(71) Applicants: Jiunn-Kuang Chen, Zhubei (TW); Meng-Hsien Hsieh, Zhubei (TW); Rong-Jie Tu, Zhubei (TW)

(72) Inventors: Jiunn-Kuang Chen, Zhubei (TW); Meng-Hsien Hsieh, Zhubei (TW); Rong-Jie Tu, Zhubei (TW)

(73) Assignee: EOSMEM CORPORATION, Zhubei City, Hsinchu (TW)

( * ) Notice: Subject to any disclaimer, the term of this patent is extended or adjusted under 35 U.S.C. 154(b) by 0 days.

(21) Appl. No.: 14/943,227

(22) Filed: Nov. 17, 2015

(65) Prior Publication Data
US 2016/0142603 A1    May 19, 2016

Related U.S. Application Data

(63) Continuation-in-part of application No. 14/643,905, filed on Mar. 10, 2015.

(30) Foreign Application Priority Data

Nov. 19, 2014  (TW) .............................. 103140180 A
Mar. 9, 2015   (TW) .............................. 104107362 A

(51) Int. Cl.
*H04N 5/225* (2006.01)
*H04N 5/235* (2006.01)

(52) U.S. Cl.
CPC ......... *H04N 5/2256* (2013.01); *H04N 5/2354* (2013.01)

(58) Field of Classification Search
CPC ........................... H04N 5/2256; H04N 5/2354
USPC ................................... 348/370, 371
See application file for complete search history.

(56) References Cited

U.S. PATENT DOCUMENTS

| | | | | |
|---|---|---|---|---|
| 2005/0157207 A1* | 7/2005 | Voss | ....................... | H04N 5/232 348/371 |
| 2006/0284996 A1* | 12/2006 | Kanai | ..................... | H04N 5/232 348/294 |
| 2011/0317991 A1* | 12/2011 | Tsai | ......................... | G03B 9/70 396/180 |
| 2013/0076952 A1* | 3/2013 | Shi | ....................... | H04N 5/2354 348/308 |
| 2014/0063286 A1* | 3/2014 | Okada | .................. | H04N 5/2353 348/229.1 |

* cited by examiner

*Primary Examiner* — Nhan T Tran
*Assistant Examiner* — Chan Nguyen
(74) *Attorney, Agent, or Firm* — Tung & Associates

(57) ABSTRACT

The present invention discloses a method for controlling flash timing of an extension flash module cooperating with a mobile device to provide supplemental light. The method includes: detecting a specific event before a flashable time period, wherein the flashable time is a period from the time at which a last photo sensor row of a specific frame begins exposure to the time at which a first photo sensor row in the specific frame ends exposure, wherein the time period from when the specific event occurs to a flashable time in the flashable time period has a fixed length of time; and triggering a flash instruction after a delay time from when the specific event occurs, such that the flash timing of the extension flash module is in the flashable time period.

14 Claims, 8 Drawing Sheets

METHOD FOR CONTROLLING FLASH TIMING OF EXTENSION FLASH MODULE

CROSS REFERENCE

The present invention claims priority to TW 103140180, filed on Nov. 19, 2014, and TW 104107362, filed on Mar. 9, 2015. The present invention is a continuation-in-part application of U.S. application Ser. No. 14/643,905, filed on Mar. 10, 2015.

BACKGROUND OF THE INVENTION

Field of Invention

The present invention relates in general to the technology of flash lamp, and more particularly to a method for controlling flash timing of an extension flash module of a mobile device.

Description of Related Art

With continuous advance in pixels and quality of digital photography, it has become a trend for mobile devices, such as mobile phones and tablets, to carry the function of taking photos. However, these built-in digital cameras have not been able to perform so well as conventional digital cameras under the circumstances of low lighting or backlighting.

Although some built-in digital cameras also carry a light-emitting diode (LED) supplement lamp, both the battery capacity of mobile devices and the heat dissipation issue of LEDs seriously confine the volume of fill light provided by the LED supplement lamp. When the distance between the object being photographed and the LED supplement lamp exceeds one meter, the LED fill light cannot provide adequate light source to allow pixels of a photo sensor to be properly exposed.

Xenon high-intensity discharge lamps (HIDs) can provide a large amount of supplementary lighting within a short period of time. Therefore, conventional digital cameras usually carry a xenon HID. A charger in a xenon HID converts low-voltage battery power supply into high-voltage power supply and stores it in a high-capacitance high-voltage capacitor. Operating in coordination with a mechanical shutter, the xenon HID is then triggered at a proper timing to convert the electricity stored in the high-voltage capacitor into high-brightness supplementary lighting within a very short period of time so that the pixels of a photo sensor are properly exposed under circumstances of low lighting or backlighting. A xenon HID requires a high-voltage capacitor having a capacitance from dozens to hundreds of µF and able to withstand 300 to 400 volts. In pursuit of lighter, thinner and more compact mobile devices, the very large volume of such a high-voltage capacitor fails to meet the requirements of current mobile devices. Therefore, in order not to increase the volume and weight of existing mobile devices, extension HID flash modules become a feasible and even necessary option.

According to the specifications of the capacitance in high-voltage capacitors and HID lamp tubes, the flash time of HID flash modules lasts from dozens to hundreds of microseconds (µs). How to flash at the right timing so that all pixels in a photo sensor are evenly exposed is an important issue to be solved for extension HID flash modules to become a feasible option. Mobile devices which carry a photo-taking device normally adopt a complementary metal-oxide semiconductor (CMOS) photo sensor and a rolling shutter instead of a mechanical shutter, as shown in FIG. 1. FIG. 1 is a schematic drawing of a rolling shutter in the conventional art. In FIG. 1, every line represents the time during which a row in the photo sensor performs light-sensing operation. Although the length of exposure for every photo sensor row in a frame is the same, there is a delay between the time when a photo sensor row begins or ends exposure and the time when its preceding photo sensor row begins or ends exposure. During the delay time, the photo-taking device reads the exposure data in the photo sensor row and resets the pixels so as to prepare for the exposure in the next frame. Since photos are taken in different environments and photo-taking devices are also set differently, the exposure time of one photo sensor row is in a wide range, lasting approximately from a few milliseconds to hundreds of milliseconds.

However, in coordination with a rolling shutter, an extension HID flash module usually cannot locate the optimal flash timing and fails to improve the quality of photos.

SUMMARY OF THE INVENTION

From one perspective, the present invention provides a method for controlling flash timing of an extension flash module cooperating with a mobile device to provide supplemental light when the mobile device having an image retrieval device is taking a photo, the image retrieval device including pixels arranged in rows, the method comprising: detecting a specific event before a flashable time period, wherein the flashable time period is a period from the time at which a last row in a specific frame begins exposure to the time at which a first row in the specific frame ends exposure, wherein the time period from when the specific event occurs to a flashable time in the flashable time period has a fixed length of time; and informing the extension flash module the occurrence of the specific event, so that the extension flash module triggers a flash instruction after a delay time from when the specific event occurs, such that the flash timing of the extension flash module is in the flashable time period.

In one embodiment, the delay time is determined according to a flash delay time and the time period from when the specific event occurs to the flashable time in the flashable time period, wherein the flash delay time is a period from the time at which the extension flash module starts to execute the flash instruction to the time at which the extension flash module actually flashes.

In one embodiment, the time at which the specific event occurs is t0, the time at which the last row in the specific frame begins exposure is t1, and the time at which the first row in the specific frame ends exposure is t2, and wherein the delay time which begins at t0 has a duration of td1, and the flash delay time has a duration of td, wherein an initial time point of the duration of td is the time at which the extension flash module starts to execute the flash instruction, then the following relationship is fulfilled: (t1−td−t0)<td1<(t2−td−t0).

In one embodiment, the delay time is determined by steps including: (A) exposing a frame according to a given delay time; (B) checking the exposed frame and comparing brightnesses of the pixels with a reference threshold, to determine whether a pixel has a brightness lower than the reference threshold; (C1) when none of the pixels has a brightness lower than the reference threshold, setting the given delay time as a default delay time; (C2) when one or more of the pixels have a brightness lower than the reference threshold, and the pixel having brightness lower than the reference threshold is exposed earlier than half of the other pixels, shortening the delay time; and (C3) when one or more of the pixels have a brightness lower than the reference threshold, and the pixel having brightness lower than the reference threshold is exposed later than half of the other pixels, prolonging the delay time.

In one embodiment, the reference threshold of brightness is set by steps including: performing an exposure without flashing the extension flash module; and taking a lowest, highest, or average brightness among all pixels, or a brightness of a pixel at a predetermined position, as the reference threshold.

In one embodiment, the method further comprises: lowering the reference threshold when an ambient light is relatively dimmer, and raising the reference threshold when the ambient light is relatively brighter.

In one embodiment, the delay time is pre-stored in a driver program of the extension flash module or an application program of the mobile device.

In one embodiment, the delay time is stored in a memory device included in the extension flash module.

In one embodiment, the specific event includes: the time at which one of the rows of the pixels in the specific frame begins exposure; the time at which one of the rows of the pixels in the previous Nth frame prior to the specific frame begins exposure; or the time at which one of the rows of the pixels in the previous Nth frame prior to the specific frame ends exposure; wherein N is a natural number.

From yet another perspective, the present invention provides a method for controlling flash timing of an extension flash module cooperating with a mobile device to provide supplemental light when the mobile device having an image retrieval device is taking a photo, the image retrieval device including pixels arranged in rows, the method comprising: sensing a light emitting time point at which the mobile device emits light; and triggering a flash instruction after a delay time from the light emitting time point at which the mobile device emits light, such that the flash timing of the extension flash module is in a flashable time period; wherein the flashable time period is a period from the time at which a last row in a specific frame begins exposure to the time at which a first row in the specific frame ends exposure.

In one embodiment, the light emitting time point is: a time point at which a built-in light emitting diode (LED) supplement lamp of the mobile device begins to emit light for the first time or a time point at which the built-in LED supplement lamp begins to emit light for the second time.

From yet another perspective, the present invention provides a method for controlling flash timing of an extension flash module cooperating with a mobile device to provide supplemental light when the mobile device having an image retrieval device is taking a photo, the image retrieval device including pixels arranged in rows, the method comprising: detecting a specific event before a flashable time period, wherein the flashable time period is a period from the time at which a last row in a specific frame begins exposure to the time at which a first row in the specific frame ends exposure, wherein the time period from when the specific event occurs to a flashable time in the flashable time period has a fixed length of time; and triggering a flash instruction so that the extension flash module flashes during the flashable time period according to a flash delay time and the period from the specific event to the flashable time, wherein the flash delay time is a period from the time at which the extension flash module starts to execute the flash instruction to the time at which the extension flash module actually flashes.

In one embodiment, the specific event comprises the time at which the first row in the specific frame begins exposure, and the fixed length of time is the period from the time at which the first row begins exposure to the time at which the last row begins exposure.

In one embodiment, the specific event comprises the time at which a $K^{th}$ row in the specific frame begins exposure, and the fixed length of time is the period from the time at which the $K^{th}$ row begins exposure to the time at which the last row begins exposure, N and K both being natural numbers.

In one embodiment, the specific event comprises the time at which the $K^{th}$ row in a previous Nth frame prior to the specific frame begins exposure, and the fixed length of time is N frame times plus the period from the time at which the $K^{th}$ row begins exposure to the time at which the last row begins exposure, N and K being natural numbers.

In one embodiment, the specific event comprises the time at which the $K^{th}$ row in a previous Nth frame prior to the specific frame ends exposure, and the fixed length of time is N or N−1 frame times plus the period from the time at which the $K^{th}$ row begins exposure to the time at which the last row begins exposure, N and K being natural numbers.

In one embodiment, the specific event comprises the time at which a built-in LED of the mobile device begins lighting for a first time after a user presses a shutter or the time at which a built-in LED of the mobile device begins lighting for a second time after a user presses a shutter, wherein the extension flash module comprises a photometry module, and wherein when the photometry module in the extension flash module detects light from the built-in LED, the extension flash module triggers a flash instruction according to a flash delay time and the period from the time at which the built-in LED begins lighting for the first time or for the second time to the flashable time in the flashable time period, so that the extension flash module flashes during the flashable time period, wherein the flash delay time is a period from the time at which the extension flash module starts to execute the flash instruction to the time at which the extension flash module actually flashes.

The spirit of the present invention is to use a specific event as a reference time point; the time at which the specific event occurs is relatively fixed and known compared to the flashable time. Meanwhile, the delay time of the flash module is also taken into account, such that the extension flash module is triggered at a proper timing and flashes during the flashable time period. Therefore, with the method for taking photos provided by the present invention, pixels are properly exposed under a low lighting or backlighting environment, whereby the quality of photos taken by the mobile device is enhanced.

The objectives, technical details, attribute or parameters, and effects of the present invention will be better understood with regard to the detailed description of the embodiments below, with reference to the attached drawings.

DESCRIPTION OF THE PREFERRED EMBODIMENTS

The present invention will become more fully understood from the detailed description given hereinafter. The drawings as referred to throughout the description of the present invention are for illustration only, but not drawn according to actual scale.

Figure 2:
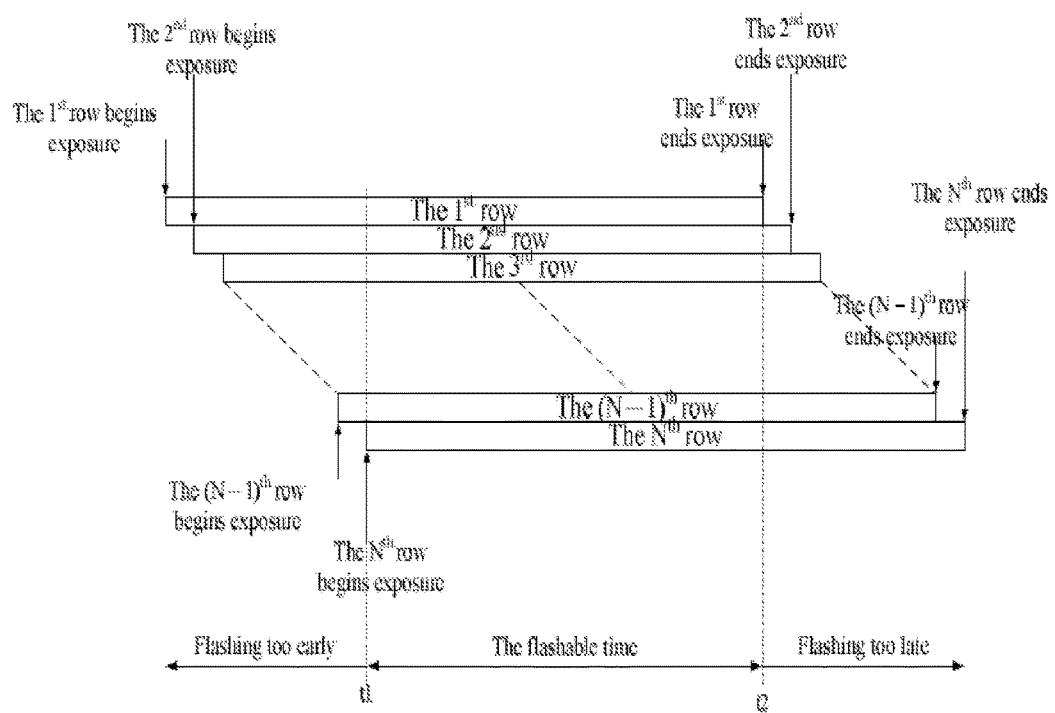
FIG. 2 is a schematic drawing showing a flashable time period according to an embodiment of the present invention.

According to the present invention, an extension flash module such as an HID flash module cooperates with a mobile device to provide supplemental light when the mobile device is taking a photo. The mobile device has an image retrieval device such as a photo sensor, and the image retrieval device includes pixels arranged in rows. FIG. 2 is a schematic drawing showing a flashable time period according to an embodiment of the present invention. Referring to FIG. 2, the flashable time period is between (and includes) t1 and t2, because the flash light within this period can be received by every photo sensor row; that is, any time point in this flashable time period is a flashable time. If the flash timing is earlier than t1, the subsequent photo sensor rows are not exposed. If the flash timing is later than t2, the previous rows of the photo sensor are not exposed. However, since a mobile device is capable of multi-tasking and may be concurrently performing other tasks, such other tasks can affect the execution timing of the flash control; as a result, the delay time between the time when a user presses the shutter and the actual flash timing is uncertain, which means that the time from when a user presses the shutter to t1 or t2 is not fixed. Conventionally, there is not a feasible and reliable way to ensure that the flash timing of the extension flash module is stably controlled between t1 and t2, but flashing at an imprecise timing seriously and critically compromises the function of an extension HID flash module. However, the present invention solves this problem. A method for taking photos is provided by the present invention, as shown in FIG. 2, and described below, in which the flash timing of the extension flash module can be stably controlled between t1 and t2.

Figure 3:
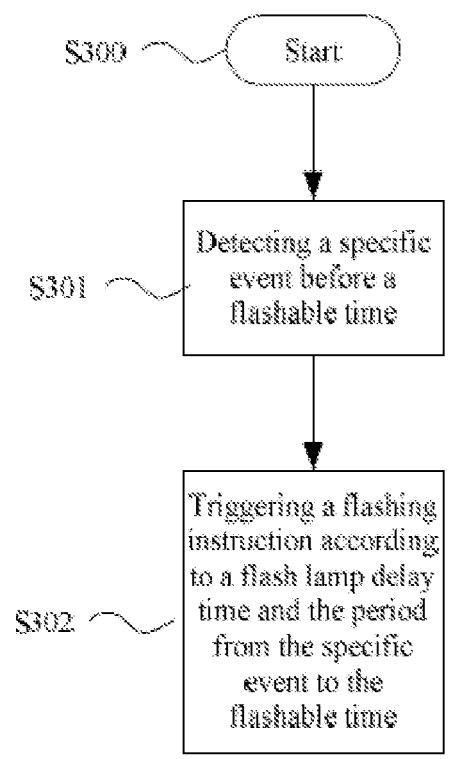
FIG. 3 shows the flow chart of a method for taking photos according to a preferred embodiment of the present invention.

FIG. 3 shows the flow chart of a method for taking photo according to a preferred embodiment of the present invention. An extension HID flash module is used to supplement light when the mobile device is taking a photo. The method includes the following steps:

Step S300: Start.

Step S301: Detecting a specific event before a flashable time. Referring to FIG. 2, in one embodiment, the image retrieval device equipped in a mobile device adopts a rolling shutter mechanism, in which the photo sensor rows of the image retrieval device are sequentially exposed row by row, and the exposure of a photo sensor row is processed in a form of integration. As shown in FIG. 2, the flashable time of a retrieved specific frame falls between (and includes) t1 and t2. Referring to FIGS. 2, t1 and t2 are the time at which the last row begins exposure (integration begins) and the time at which the first row ends exposure (integration ends), respectively. If the flash module flashes during the period between t1 and t2 (the flashable time period), every row can receive the flash light during its exposure.

After a mobile device confirms that a user has pressed the shutter giving a shutter instruction, the mobile device will perform preparation actions, such as performing photometry and focusing, and determine a specific frame to be retrieved and the exposure time of a photo sensor. At and after a certain moment, the flashable time period t1—t2 of the extension flash module becomes known, i.e., it has a fixed relationship, which will no longer be affected by any other task that the mobile device may be performing, with a certain event (referred to as a "specific event" in this specification) that occurs at that certain moment. Based on this, for instance, a designer may predict the time of the specific frame by designing a certain application program or use a signal from a certain hardware to determine the time of the specific frame. That is, when the specific event occurs, the time period from when the specific event occurs to the flashable time is fixed and is a relatively stable and known period. There is a fixed length of time between the occurrence of the specific event and the flashable time. (The flashable time can be any designated time point within the flashable time period.) Therefore, in one aspect, the present invention adopts the time of a specific event as the basis for prediction.

In one embodiment, the prediction of the flashable time and the flash control can be implemented by a mobile device application program (e.g., a mobile phone application program), and for example, the mobile phone application program can retrieve the time at which the first photo sensor row begins exposure (in a specific frame desired to be retrieved) as the specific event. In this example, the fixed length of time is the period from the time at which the first photo sensor row begins exposure to the time at which the last photo sensor row begins exposure. For another example, the specific event can be the time at which the Kth photo sensor row (in a specific frame desired to be retrieved) begins exposure. In this example, the fixed length of time is the period from the time at which the Kth photo sensor row begins exposure to the time at which the last photo sensor row begins exposure. For another example, the specific event can be the time at which the Kth photo sensor row in the previous Nth frame begins exposure. In this example, the fixed length of time is N frame times plus the period from the time at which the Kth photo sensor row begins exposure to the time at which the last photo sensor row begins exposure. For another example, the specific event can be the time at which the Kth photo sensor row in the previous Nth frame ends exposure. If the Kth photo sensor row ends exposure earlier than the time at which the last photo sensor row begins exposure, then in this example, the fixed length of time is N frame times plus the period from the time at which the Kth photo sensor row ends exposure to the time at which the last photo sensor row begins exposure. If the Kth photo sensor row ends exposure later than the time at which the last photo sensor row begins exposure, then in this example, the fixed length of time is N−1 frame times plus the period from the time at which the Kth photo sensor row ends exposure to the time at which the last photo sensor row begins exposure. In the above examples, the fixed length of time, which corresponds to the period from the specific event to the flashable time, is calculated with reference to the last time point (t2) of the flashable time period. However, equivalently, the fixed length of time can calculated with reference to any time point between (and including) t1 and t2.

Figure 4:
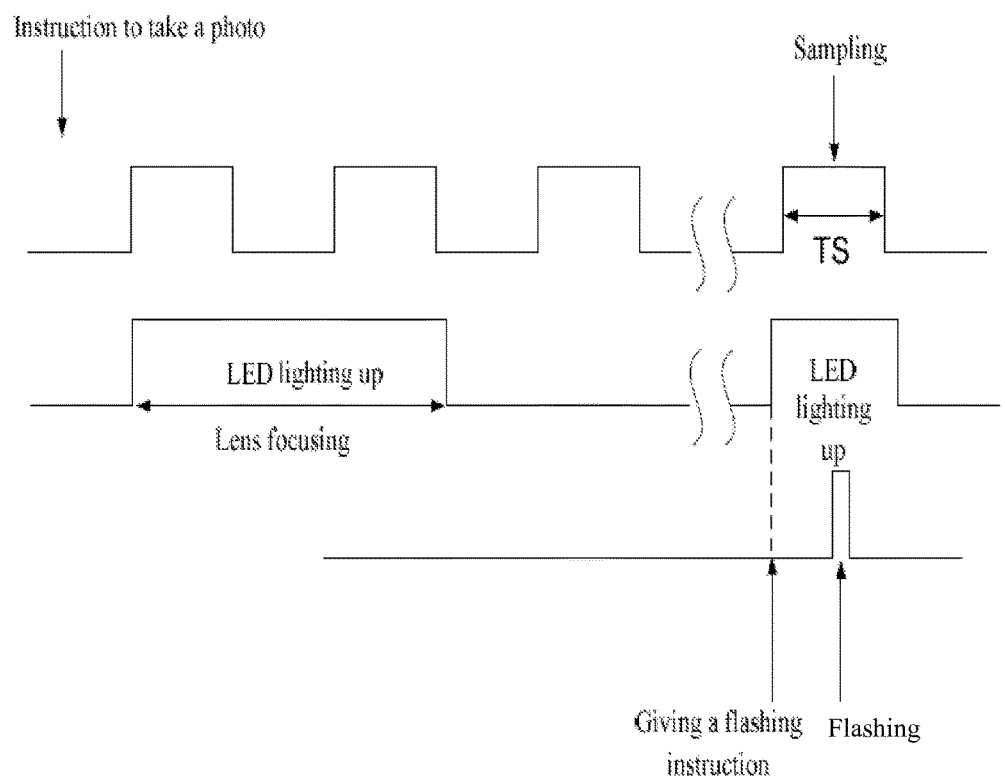
FIG. 4 shows the oscillogram of signals from a built-in LED supplement lamp of a mobile device adopting the method for taking photos according to a preferred embodiment of the present invention.

In another embodiment, the prediction of the flashable time and the flash control can be implemented by referring to a hardware signal. For example, the specific event may be a signal from a built-in LED supplement lamp of the mobile device. FIG. 4 shows the oscillogram of signals from a built-in LED supplement lamp of a mobile device adopting the method for taking photo according to a preferred embodiment of the present invention. Referring to FIG. 4, when the mobile device is taking a photo, the built-in LED supplement lamp lights up for a first time to indicate that the lens is focusing and lights up for a second time to show that an image is being retrieved (sensed). In this example, in the step S301 of the present invention, the specific event may be the event that the LED supplement lamp lights up for the first time or for the second time.

Step S302: Triggering a flash instruction so that the extension flash module flashes during the flashable time period according to a flash delay time and the period from the specific event to the flashable time. "Trigger a flash instruction" in the context of this specification means that the extension flash module starts to execute a flash instruction that it receives or has received. As far as the extension flash module is concerned, a flash delay time td exists between the time at which the extension flash module starts to execute a flash instruction and the time at which the actual flashing of the extension flash module occurs. Therefore, the flash control should take into account, in addition to the period from the specific event to the flashable time, the delay time of the extension flash module itself. That is, because the above-mentioned period from the specific event to the flashable time is a constant and the delay time of the extension flash module is a known value, the method of this embodiment can determine when to trigger the flash instruction according to such constant and known value. For example, if the delay time from the time at which the flash instruction is received by the extension flash module to the time at which the actual flashing of the extension flash module occurs is td (td is calculated with reference to the time at which the flash instruction is received), then the time point for triggering the flash instruction should be between (t1−td) and (t2−td). Or, if the reference initial time point of the delay time td is the time at which the specific event occurs (the delay time td starts being counted at the time when the specific event occurs) and assuming that such time at which the specific event occurs is t0, then the flash timing needs to fulfill the relationship: $(t1-t0)<td<(t2-t0)$. The extension flash module flashes when the delay time td ends. If the delay time td is calculated with reference to a certain other time point which has a time difference from the time at which the specific event occurs, such time difference can be taken into account, depending on the definition of the delay time td (i.e., depending on when to start counting the delay time td).

Figure 5:
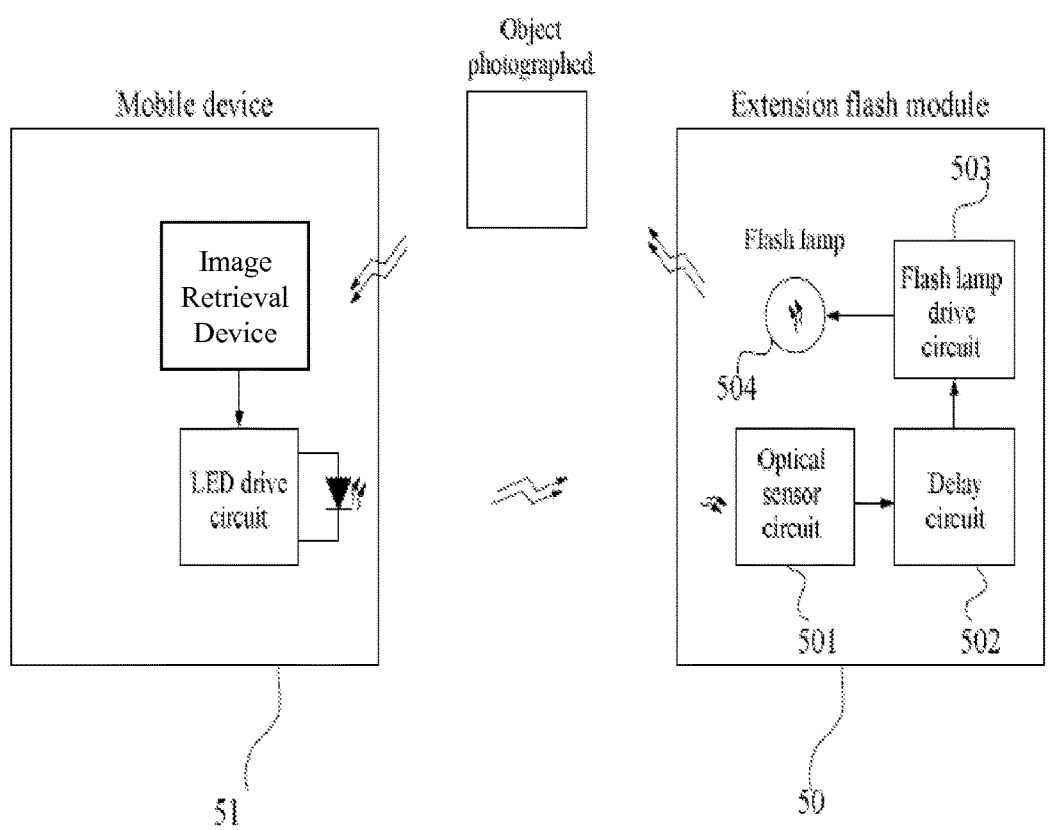
FIG. 5 shows a system block diagram of an extension flash module according to a preferred embodiment of the present invention.

The above embodiments give examples as to how the flash timing can be controlled when the extension flash module is connected by hardware (e.g. via a universal serial bus (USB), or a headset socket) to the mobile device, in coordination with the internal software of the mobile device to determine the specific event. In another embodiment which is in compliance with the spirit of the present invention, the extension flash module may also be optically coupled to control the flash timing. FIG. 5 shows a system block diagram of an extension flash module adopting the method according to one embodiment of the present invention. Referring to FIG. 5, an extension flash module 50 may be, for example, an extension flash module which is not electrically connected to the mobile device 51 and can even be a separated non-contact module to the mobile device 51. The extension flash module 50 includes an optical sensor circuit 501, a delay circuit 502, a flash lamp drive circuit 503, and an HID lamp 504. When the LEDs in the mobile device 51 light up, such an event is detected by the optical sensor circuit 501 as the specific event and triggers the HID lamp 504 to flash during the flashable time (t1~t2). Typically, the LEDs in the mobile device 51 light up twice (first for focusing and second for flashing), and the specific event can be defined as either one of them.

Please note that optical coupling is only one among many possible ways to embody the present invention; people ordinarily skilled in the art would readily conceive, in light of the teachings of the present invention, that the present invention may also be implemented wirelessly—such as via Wi-Fi, near field communication (NFC) or Bluetooth—or by detecting a sound produced by the shutter of the mobile device. The present invention is not limited to the embodiments described herein.

The above description describes a "fixed length of time" from when a specific event occurs to the flashable time, which is a relatively stable and known time period. However, there can still be insignificant variations or errors caused by unknown sources; therefore even designers themselves cannot guarantee that the "fixed length of time" absolutely does not contain any minor variation. Nevertheless, from the standpoint of practical application, as long as such a variation is within than an acceptable range, a good flashing control can still be achieved. For example, if an error in calculating the "fixed length of time" is smaller than half of the flashable time period, such an error is tolerable and still falls within the scope defined by the present invention.

Figure 6:
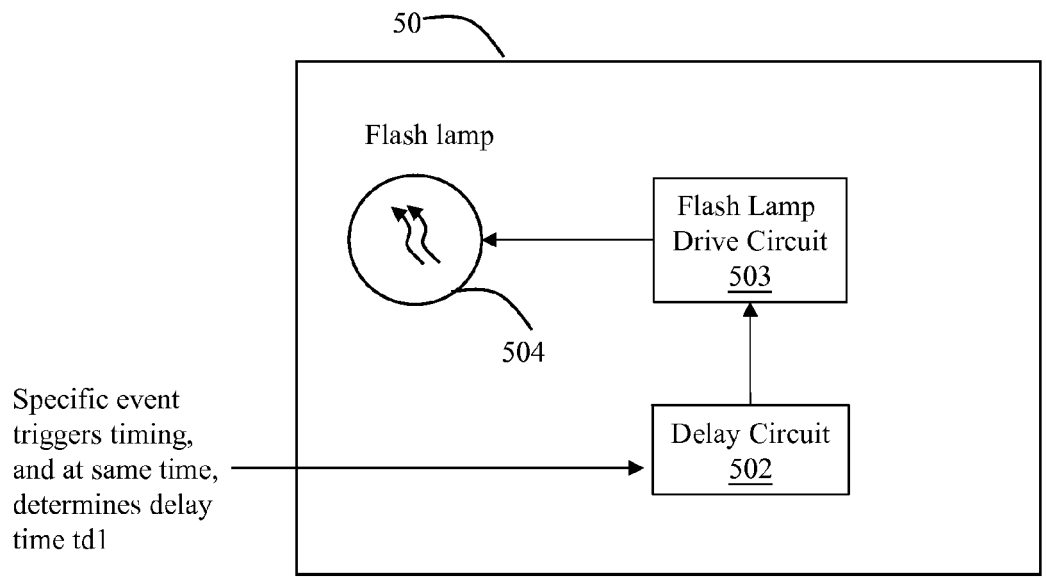
FIG. 6 shows another preferred embodiment of the present invention.

In addition, because the flash module is used as an extension hardware to be attached to a mobile device, the extension flash module must be able to cooperate with different types of mobile devices. Although as far as a single mobile device is concerned, the period from the specific event to the flashable time is a constant, different types of mobile devices have different constants. In one embodiment, if the constants of some types of mobile devices are known, different known constants can be pre-stored in a driver program of the extension flash module or an application program of the mobile device. Please refer to FIG. 6. For example, when a mobile device is to be equipped with an extension flash module, an application program can be installed therein. This application program identifies the type or a certain attribute or parameter of the mobile device, and correspondingly determines the delay time td1 of the delay circuit 502. As described above, there is a delay time td from the time at which the flash instruction is received by the extension flash module to the time at which the actual flashing of the extension flash module occurs (td is calculated with reference to the time at which the flash instruction is received), so the delay time td1 of the delay circuit 502 should be controlled, such that the time point for triggering the flash instruction is between (t1−td) to (t2−td). Assuming that the time at which the specific event occurs is t0 and the delay time td1 begins at t0, the following relationship should be fulfilled: $(t1-td-t0)<td1<(t2-td-t0)$.

Figure 7:
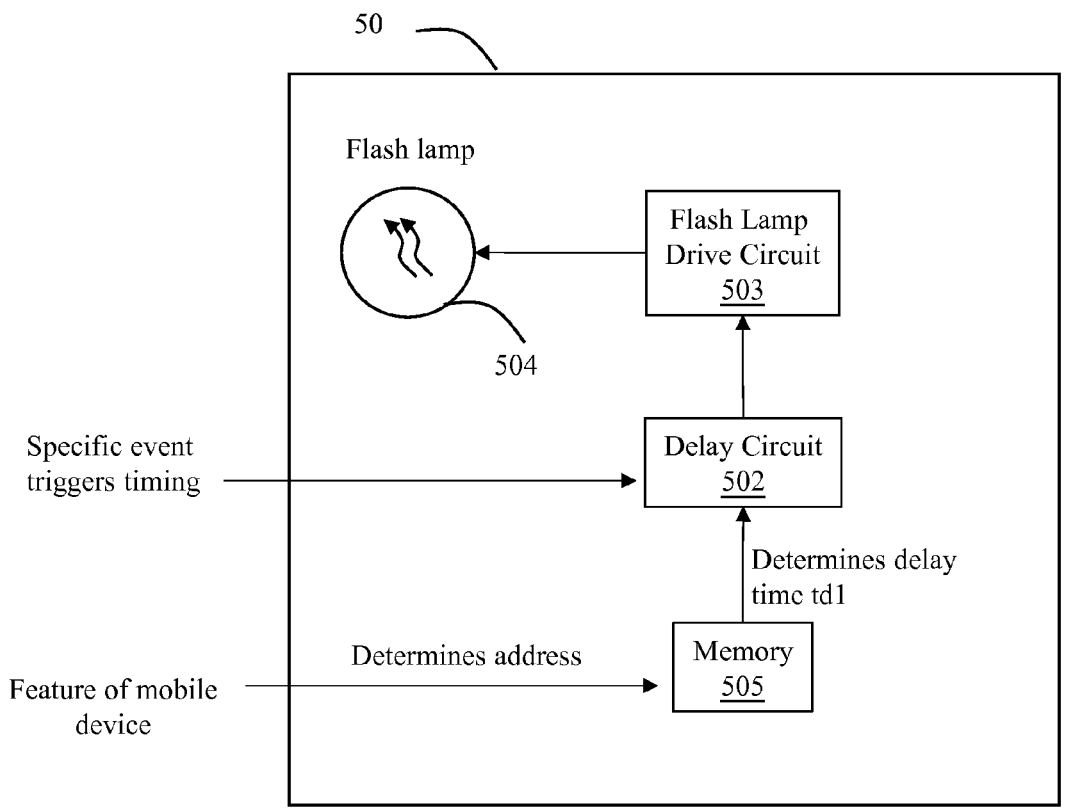
FIGS. 7-8 show yet another preferred embodiments of the present invention.
Figure 8:
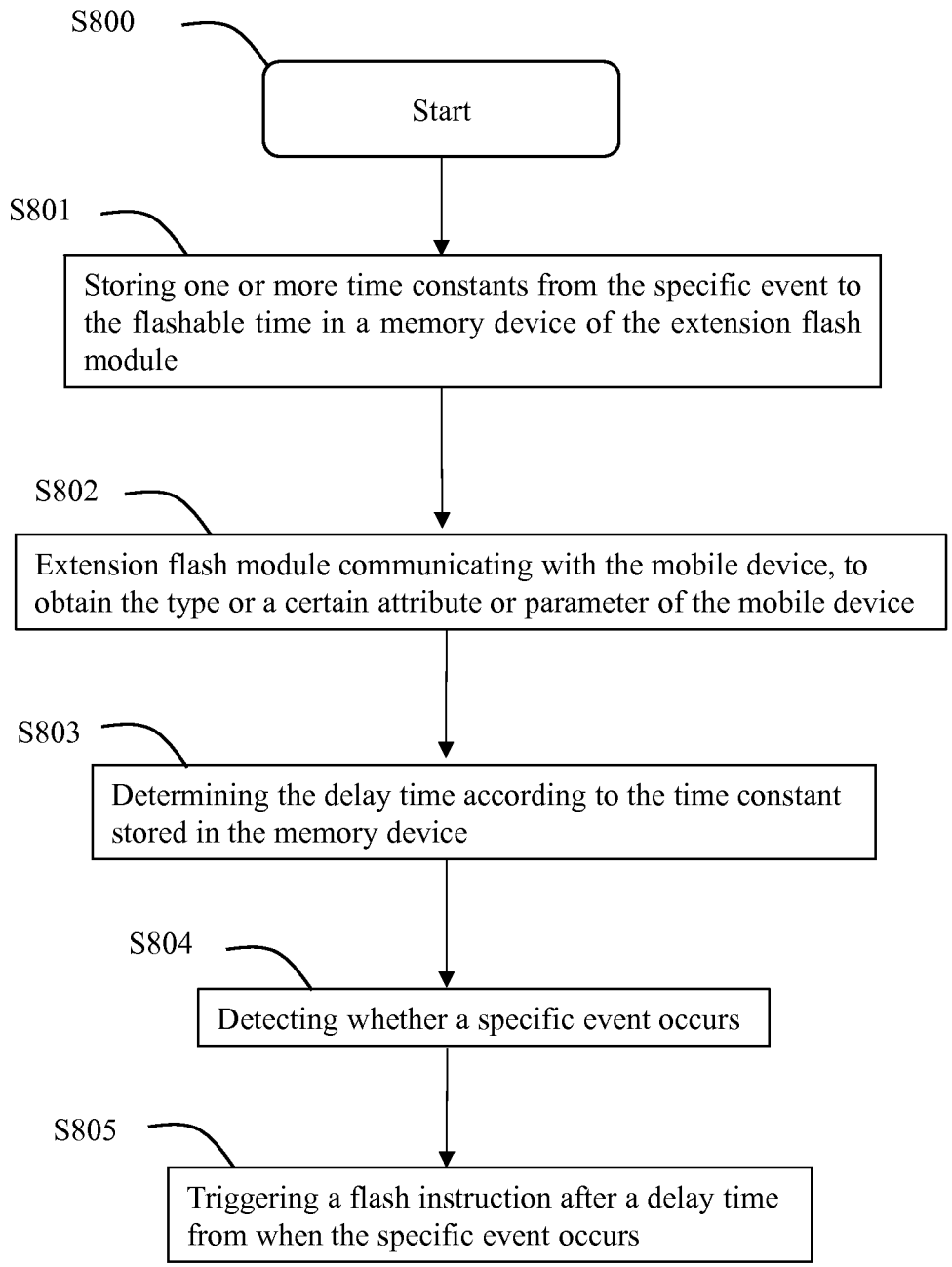

In another embodiment, different known constants can be stored in the hardware circuit. Please refer to FIG. 7 in conjugation with FIG. 8. In this embodiment, first, storing one or more time constants from the specific event to the flashable time, corresponding to one or more mobile devices, in a memory device (memory 505) of the extension flash module (step S801). When it is desired to take a photo, the extension flash module 50 communicates with the mobile device, to obtain the type or a certain attribute or parameter of the mobile device (step S802). The extension flash module 50 determines the delay time td1 according to the time constant stored in the memory device with reference to the type or the attribute or parameter of the mobile device (step S803). Next, a specific event occurs and is detected (step S804). A flash instruction is triggered after a delay time td1 from when the specific event occurs (step S805).

Figure 1:
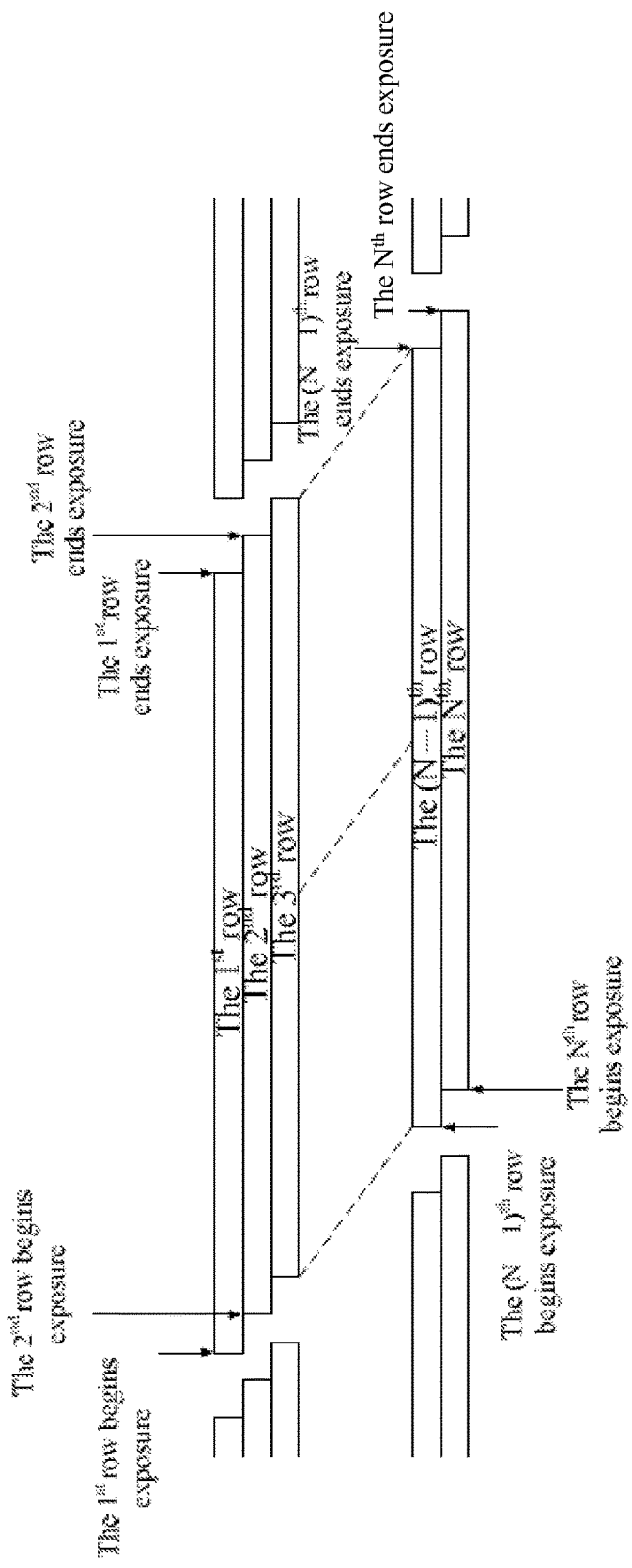
FIG. 1 is a schematic drawing explaining how a rolling shutter operates according to the conventional art.
Figure 9:
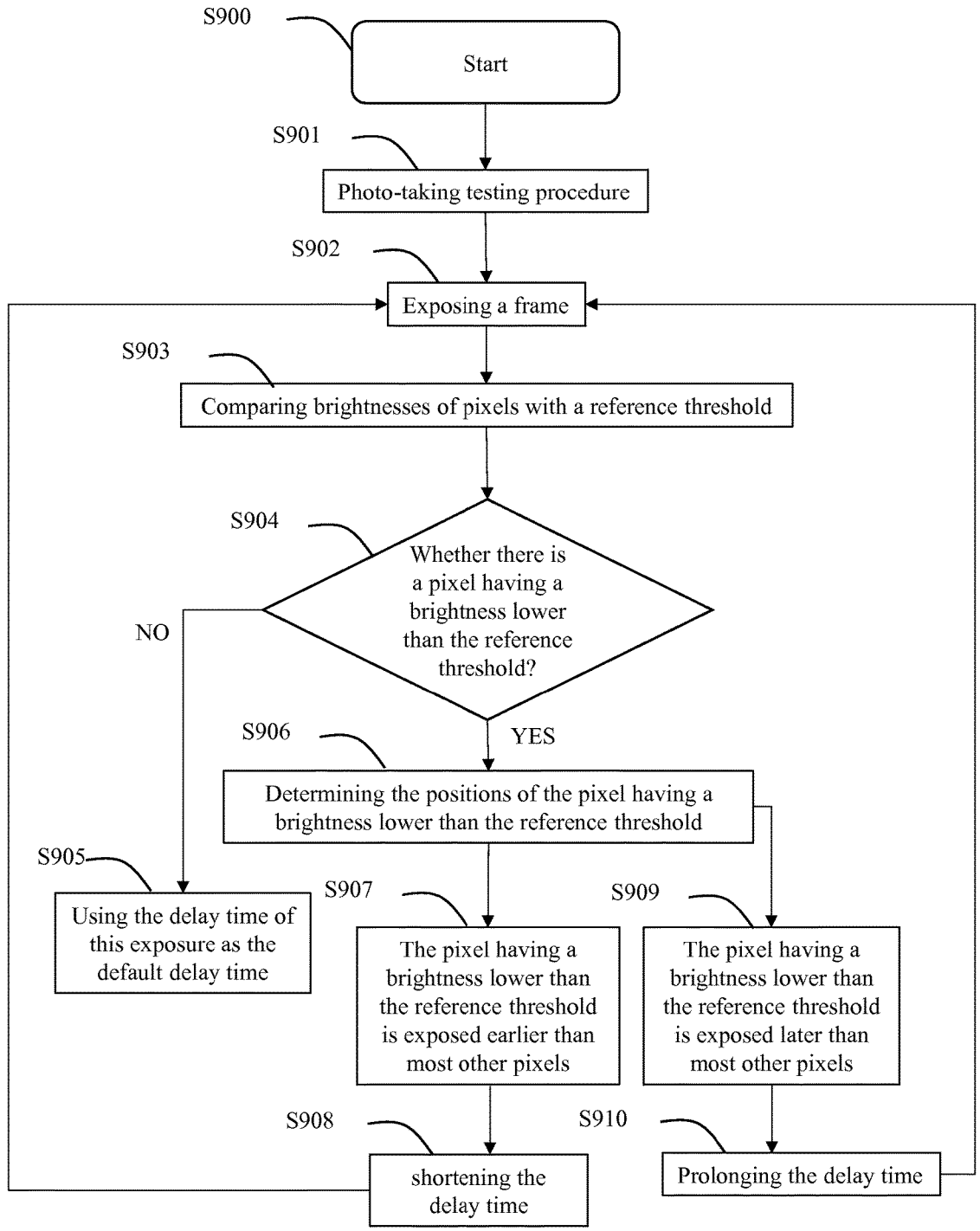
FIG. 9 shows still another preferred embodiment of the present invention.

In another embodiment, referring to FIG. 9, when the time constants for some types of mobile devices are unknown, an optimum delay time can be determined through a checking process. In this embodiment, first, a photo-taking testing procedure can be taken, for example but not limited to, when a mobile device is equipped with an extension flash module and it is prepared to take a first photo, or when a driver program of the extension flash module is being installed, or at any other suitable moment (step S901). In this phototaking testing procedure, the image retrieval device (such as a photo sensor) in the mobile device exposes a frame, and the extension flash module flashes according to a given delay time (step S902). Next, this embodiment checks the exposed frame, i.e., comparing the brightnesses of the pixels with a reference threshold (step S903), to determine whether there is a pixel having a brightness lower than the reference threshold (step S904). When none of the pixels has a brightness lower than the reference threshold, the given delay time can be set as the default delay time (step S905). When there is one pixel (or a predetermined number of pixels) having a brightness lower than the reference threshold, and the pixel having the lower brightness is exposed earlier than most (such as half of) other pixels (e.g., the first row or the first several rows of pixels in FIG. 1) (step S906 and step S907), then the delay time is shortened (i.e., the time for triggering the flash instruction is moved earlier) (step S908), and the process returns to the step S902. When there is one pixel (or a predetermined number of pixels) having a brightness lower than the reference threshold, and the pixel having the lower brightness is exposed later than most (such as half of) other pixels (e.g., the Nth row or the last several rows of pixels in FIG. 1) (step S906 and step S909), then the delay time is prolonged (i.e., the time for triggering the flash instruction is moved later) (step S910), and the process returns to the step S902. Thus, an appropriate delay time can be obtained.

To avoid misjudgments, a pixel number threshold can be set, such that: the delay time is adjusted only when the number of the pixels having a brightness lower than the reference threshold exceeds the pixel number threshold.

In addition, in one embodiment, the reference threshold of brightness can be determined by, for example but not limited to: exposing the pixels without flashing the extension flash module, and taking the thus obtained brightness (which can be, e.g., a lowest, highest, or average brightness among all pixels, or a brightness of a pixel at a specific position such as the center, a peripheral location, or a corner) as the reference threshold.

In one embodiment, the reference threshold of brightness can be adjusted according to the sensing of the ambient light. For example, if the mobile device is equipped with an ambient light sensor, the sensed value of the ambient light can be taken as a reference to correspondingly lower the reference threshold when the ambient light is relatively dimmer, and correspondingly raise the reference threshold when the ambient light is relatively brighter.

In light of the above, the spirit of the present invention is to use a specific event as a reference time point; the time at which the specific event occurs is relatively fixed and known compared to the flashable time. Meanwhile, the delay time of the flash module is also taken into account, such that the extension flash module is triggered at a proper timing and flashes during the flashable time period. Therefore, with the method for taking photos provided by the present invention, pixels are properly exposed under a low lighting or backlighting environment, whereby the quality of photos taken by the mobile device is enhanced.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art. It will be apparent that various changes and modifications can be made without departing from the spirit and scope of the invention as defined in the appended claims.

What is claimed is:

1. A method for controlling flash timing of an extension flash module cooperating with a mobile device to provide supplemental light when the mobile device having an image retrieval device is taking a photo, the image retrieval device including pixels arranged in rows, the method comprising:
   detecting a specific event before a flashable time period, wherein the flashable time period is a period from the time at which a last row in a specific frame begins exposure to the time at which a first row in the specific frame ends exposure, wherein the time period from when the specific event occurs to a flashable time in the flashable time period has a fixed length of time; and
   informing the extension flash module the occurrence of the specific event, so that the extension flash module triggers a flash instruction after a delay time from when the specific event occurs, such that the flash timing of the extension flash module is in the flashable time period;
   wherein the delay time is determined by steps including:
   (A) exposing a frame according to a given delay time;
   (B) checking the exposed frame and comparing brightnesses of the pixels with a reference threshold, to determine whether a pixel has a brightness lower than the reference threshold;
   (C1) when none of the pixels has a brightness lower than the reference threshold, setting the given delay time as a default delay time;
   (C2) when one or more of the pixels have a brightness lower than the reference threshold, and the pixel having brightness lower than the reference threshold is exposed earlier than half of the other pixels, shortening the delay time; and
   (C3) when one or more of the pixels have a brightness lower than the reference threshold, and the pixel having brightness lower than the reference threshold is exposed later than half of the other pixels, prolonging the delay time.

2. The method of claim 1, wherein the delay time is determined according to a flash delay time and the time period from when the specific event occurs to the flashable time in the flashable time period, wherein the flash delay time is a period from the time at which the extension flash module starts to execute the flash instruction to the time at which the extension flash module actually flashes.

3. The method of claim 2, wherein the time at which the specific event occurs is t0, the time at which the last row in the specific frame begins exposure is t1, and the time at which the first row in the specific frame ends exposure is t2, and wherein the delay time which begins at t0 has a duration of td1, and the flash delay time has a duration of td, wherein an initial time point of the duration of td is the time at which the extension flash module starts to execute the flash instruction, then the following relationship is fulfilled: $(t1-td-t0) < td1 < (t2-td-t0)$.

4. The method of claim 1, wherein the reference threshold of brightness is set by steps including:
performing an exposure without flashing the extension flash module; and
taking a lowest, highest, or average brightness among all pixels, or a brightness of a pixel at a predetermined position, as the reference threshold.

5. The method of claim 1, further comprising:
lowering the reference threshold when an ambient light is relatively dimmer, and raising the reference threshold when the ambient light is relatively brighter.

6. The method of claim 1, wherein the delay time is pre-stored in a driver program of the extension flash module or an application program of the mobile device.

7. The method of claim 1, wherein the delay time is stored in a memory device included in the extension flash module.

8. The method of claim 1, wherein the specific event includes:
the time at which one of the rows of the pixels in the specific frame begins exposure;
the time at which one of the rows of the pixels in the previous Nth frame prior to the specific frame begins exposure; or
the time at which one of the rows of the pixels in the previous Nth frame prior to the specific frame ends exposure;
wherein N is a natural number.

9. A method for controlling flash timing of an extension flash module cooperating with a mobile device to provide supplemental light when the mobile device having an image retrieval device is taking a photo, the image retrieval device including pixels arranged in rows, the method comprising:
sensing a light emitting time point at which the mobile device emits light; and
triggering a flash instruction after a delay time from the light emitting time point at which the mobile device emits light, such that the flash timing of the extension flash module is in a flashable time period;
wherein the flashable time period is a period from the time at which a last row in a specific frame begins exposure to the time at which a first row in the specific frame ends exposure
wherein the delay time is determined by steps including:
(A) exposing a frame according to a given delay time;
(B) checking the exposed frame and comparing brightnesses of the pixels with a reference threshold, to determine whether a pixel has a brightness lower than the reference threshold;
(C1) when none of the pixels has a brightness lower than the reference threshold, setting the given delay time as a default delay time;
(C2) when one or more of the pixels have a brightness lower than the reference threshold, and the pixel having brightness lower than the reference threshold is exposed earlier than half of the other pixels, shortening the delay time; and
(C3) when one or more of the pixels have a brightness lower than the reference threshold, and the pixel having brightness lower than the reference threshold is exposed later than half of the other pixels, prolonging the delay time.

10. The method of claim 9, wherein the light emitting time point is: a time point at which a built-in light emitting diode (LED) supplement lamp of the mobile device begins to emit light for the first time or a time point at which the built-in LED supplement lamp begins to emit light for the second time.

11. The method of claim 9, wherein the reference threshold of brightness is set by steps including:
performing an exposure without flashing the extension flash module; and
taking a lowest, highest, or average brightness among all pixels, or a brightness of a pixel at a predetermined position, as the reference threshold.

12. The method of claim 9, further comprising:
lowering the reference threshold when an ambient light is relatively dimmer, and raising the reference threshold when the ambient light is relatively brighter.

13. The method of claim 9, wherein the delay time is pre-stored in a driver program of the extension flash module or an application program of the mobile device.

14. The method of claim 9, wherein the delay time is stored in a memory device included in the extension flash module.

* * * * *